US008391121B2

(12) United States Patent
Kawano et al.

(10) Patent No.: US 8,391,121 B2
(45) Date of Patent: Mar. 5, 2013

(54) OPTICAL HEAD DEVICE AND READING SYSTEM FOR MULTI-LAYERED OPTICAL RECORDING MEDIUM

(75) Inventors: Noriyuki Kawano, Tokyo (JP); Jiro Yoshinari, Tokyo (JP); Motohiro Inoue, Tokyo (JP); Atsuko Kosuda, Tokyo (JP); Naoki Hayashida, Tokyo (JP)

(73) Assignee: TDK Corporation, Tokyo (JP)

( * ) Notice: Subject to any disclaimer, the term of this patent is extended or adjusted under 35 U.S.C. 154(b) by 273 days.

(21) Appl. No.: 12/585,395

(22) Filed: Sep. 14, 2009

(65) Prior Publication Data

US 2010/0085847 A1   Apr. 8, 2010

(30) Foreign Application Priority Data

Oct. 6, 2008  (JP) .................................. 2008-260102

(51) Int. Cl.
*G11B 7/00* (2006.01)
(52) U.S. Cl. .................. 369/112.24; 369/44.14; 369/94; 369/44.23
(58) Field of Classification Search .................. 369/103, 369/112.24, 44.14, 44.23, 94
See application file for complete search history.

(56) References Cited

U.S. PATENT DOCUMENTS

| | | | |
|---|---|---|---|
| 2003/0012093 A1* | 1/2003 | Tada et al. | 369/44.27 |
| 2006/0002250 A1* | 1/2006 | Shirota et al. | 369/44.27 |
| 2006/0181985 A1* | 8/2006 | Komma et al. | 369/47.39 |
| 2009/0086604 A1 | 4/2009 | Usami et al. | |
| 2009/0316537 A1* | 12/2009 | Nakatani et al. | 369/44.14 |

FOREIGN PATENT DOCUMENTS

| | | |
|---|---|---|
| JP | 02249141 A * | 10/1990 |
| JP | A-2006-252725 | 9/2006 |
| JP | A-2007-004879 | 1/2007 |
| WO | WO 2008/099708 A1 | 8/2008 |
| WO | WO 2008099708 A1 * | 8/2008 |

* cited by examiner

*Primary Examiner* — Latanya Bibbins
(74) *Attorney, Agent, or Firm* — Oliff & Berridge, PLC

(57) ABSTRACT

A recording and reading system for a multi-layered optical recording medium includes: a multi-layered optical recording medium including a plurality of recording layers and a single servo layer; and an optical head. The optical head includes a recording and reading objective lens of a signal recording and reading optical system and a servo objective lens of a servo signal detection optical system that are disposed on a common actuator. The recording and reading objective lens is mounted on the common actuator through a minute-drive apparatus so as to be minutely driven in a focusing direction relative to the servo objective lens. When the servo objective lens is focused on the servo layer, a reading light beam is quickly focused on a target one of the plurality of recording layers.

4 Claims, 4 Drawing Sheets

OPTICAL HEAD DEVICE AND READING SYSTEM FOR MULTI-LAYERED OPTICAL RECORDING MEDIUM

BACKGROUND OF THE INVENTION

1. Field of the Invention

The present invention relates to an optical head device for reading information from a multi-layered optical recording medium including a plurality of recording layers and a single servo layer. The invention also relates to a reading system for a multi-layered optical recording medium including the optical head device.

2. Description of the Related Art

Japanese Patent Application Laid-Open No. 2007-4879 discloses focal point control, such as focus control or tracking control, for light beam irradiation of a multi-layered optical recording medium that includes a plurality of recording layers for recording information using holography.

In the invention disclosed in Japanese Patent Application Laid-Open No. 2007-4879, to record and read information on and from the multi-layered optical recording medium, a laser light source for a servo layer and a laser light source for the recording layers are separately provided. The light beams from these light sources are projected to the optical recording medium through a common objective lens to simultaneously perform recording and reading and servo control including focus servo and tracking servo.

The light beam for the servo layer is focused always on the same servo layer. However, the light beam for the recording layers must be focused on a predetermined one of the plurality of recording layers.

When a common objective lens is used for irradiation with light beams for servo control and recording and reading and for reception of the reflected light beams, as in the invention disclosed in Japanese Patent Application Laid-Open No. 2007-4879, the servo light beam and the recording and reading light beam must be separately focused at different timings. In addition, the information from the servo layer and the information from the recording layers must be separated from each other by modulating the laser light sources at different frequencies or turning the laser light sources on-off in a time sharing manner.

Therefore, when recording and reading operations are performed at different speeds such as 2× and 4× speeds, quick focusing is difficult, and the modulation frequency setting for the light sources is complicated. This is an obstacle to an increase in recording and reading speed. Moreover, since the servo light beam and the recording and reading light beam are simultaneously projected through the common objective lens and the reflected light beams are received also through the same, inter-layer stray light between the servo layer and the recording layer or between different recording layers may cause undesirable noise during information reproduction.

SUMMARY OF THE INVENTION

In view of the foregoing problems, various exemplary embodiments of this invention provide an optical head device and a recording and reading system for a multi-layered optical recording medium including a plurality of recording layers and a single servo layer. With these device and system, the information from the servo layer and the information from the recording layers can be reliably separated from each other, and servo light and recording and reading light can be quickly focused, so that the recording and reading speed can be increased. In addition, inter-layer stray light causes less adverse effects.

In summary, the above-described objectives are achieved by the following embodiments of the present invention.

(1) An optical head device, comprising: a signal reading optical system including a signal reading objective lens; and a servo signal detection optical system including a servo objective lens, the optical head device for irradiating a multi-layered optical recording medium including a plurality of recording layers and a single servo layer with a reading light beam via the signal reading objective lens and with a servo light beam through the servo objective lens, and for receiving the reading light beam reflected from the multi-layered optical recording medium through the signal reading objective lens and the servo light beam reflected from the multi-layered optical recording medium through the servo objective lens, the optical head device further comprising: a common actuator on which the signal reading objective lens and the servo objective lens are disposed; and a focal point moving mechanism for moving a focal point of at least one of the signal reading objective lens and the servo objective lens.

(2) The optical head device according to (1), wherein the signal reading objective lens and the servo objective lens are provided with the focal point moving mechanism respectively.

(3) The optical head device according to (1), wherein the focal point moving mechanism is a minute-drive apparatus that mounts at least one of the signal reading objective lens and the servo objective lens to the common actuator so as to be minutely driven in a focusing direction.

(4) The optical head device according to (1), wherein at least one of the signal reading objective lens and the servo objective lens is a focal distance variable lens serving as the focal point moving mechanism.

(5) The optical head device according to (1), wherein:
each of the signal reading optical system and the servo signal detection optical system includes a collimator lens; and the focal point moving mechanism is a collimator lens drive apparatus for driving in a direction of an optical axis at least one of the collimator lenses of the signal reading optical system and the servo signal detection optical system.

(6) The optical head device according to (1), wherein: each of the signal reading optical system and the servo signal detection optical system includes a collimator lens; and the collimator lens of at least one of the signal reading optical system and the servo signal detection optical system is a focal distance variable lens serving as the focal point moving mechanism.

(7) A reading system for a multi-layered optical recording medium, comprising: the optical head device according to any of (1) to (6); and a multi-layered optical recording medium including a plurality of recording layers and a single servo layer.

(8) The reading system for a multi-layered optical recording medium according (7), wherein the reading objective lens and the servo objective lens are disposed such that optical center axes thereof are aligned with a same track of the multi-layered optical recording medium so as to be arranged in a lengthwise direction of the track.

(9) The reading system for a multi-layered optical recording medium according to (7), wherein the servo layer in the multi-layered optical recording medium includes a track for determining positions of the reading objective lens and the servo objective lens.

In the optical head device for a multi-layered optical recording medium of the present invention, the focal point of at least one of the reading objective lens and the servo objective lens can be minutely changed in a focusing direction relative to the other while the reading objective lens and the servo objective lens are driven by the common actuator. Therefore, as compared with the case in which the servo light beam and the reading light beam are simultaneously projected through a common object lens, the reading light beam can be focused more quickly. Inter-layer stray light causes less adverse effects since the amount of unfocused reflected light is small, and the information from the servo layer and the information from the recording layers are reliably separated from each other. In addition, the information can be read at a higher speed.

DETAILED DESCRIPTION OF THE PREFERRED EMBODIMENTS

Hereinafter, a description will be given of an optical head device according to an exemplary embodiment of the present invention and a recording and reading system for a multi-layered optical recording medium with the optical head device.

Figure 1:
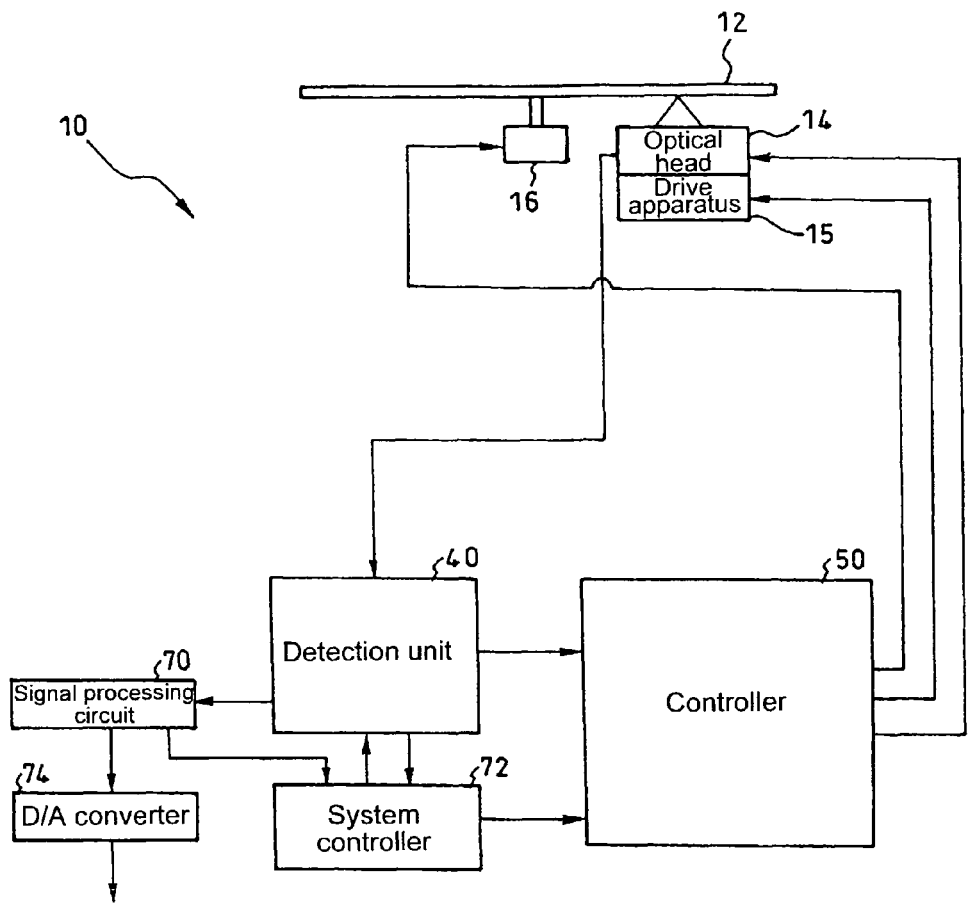
FIG. 1 is a block diagram illustrating a recording and reading system for a multi-layered optical recording medium including an optical head device according to a first exemplary embodiment of the present invention.

As shown in FIG. 1, a recording and reading system for a multi-layered optical recording medium (hereinafter referred to as the recording and reading system) 10 according to a first exemplary embodiment includes: a multi-layered optical recording medium 12; an optical head device (hereinafter referred to as an optical head) 14; a detector circuit 40 for outputting a reading (RF) signal, a tracking error (TE) signal, a focus error (FE) signal, and other signals based on a signal from the optical head 14; a controller 50; a signal processing circuit 70 for reading a reference clock and determining an address in the RF signal from the detector circuit 40; a system controller 72; and a D/A converter 74. The controller 50 controls, based on an output signal from the detector circuit 40, the optical head 14, a drive apparatus 15 for driving the optical head 14 in the radial direction of the multi-layered optical recording medium 12, and a spindle motor 16 for rotationally driving the multi-layered optical recording medium 12.

Figure 2:
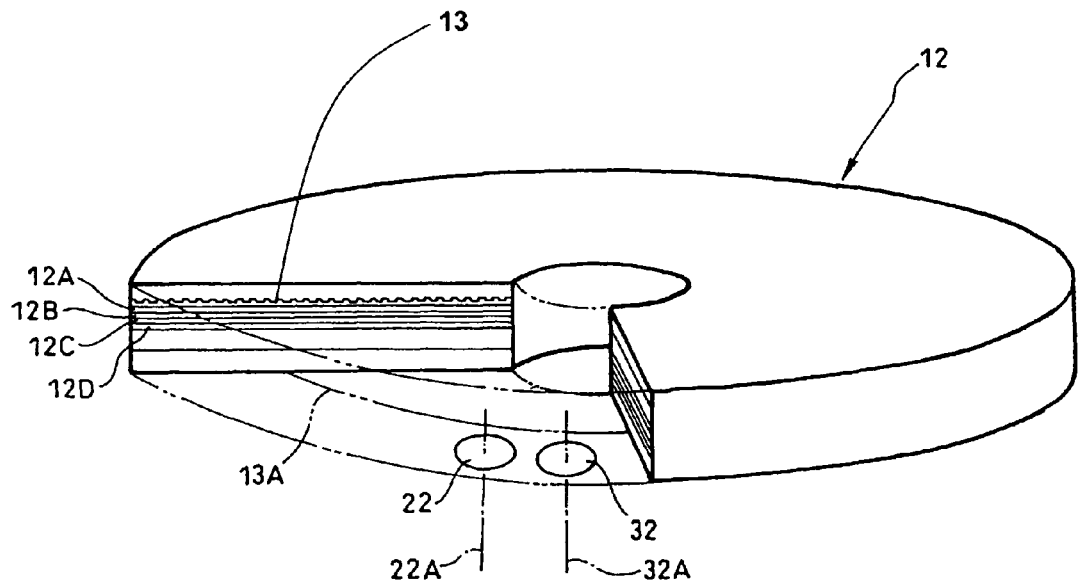
FIG. 2 is a partially sectional schematic perspective view illustrating the positional relationship between the multi-layered optical recording medium, and the recording and reading objective lens and the servo objective lens of the optical head used in the first exemplary embodiment.

As shown in FIG. 2, the multi-layered optical recording medium 12 is configured to include a plurality of recording layers 12A, 12B, 12C, 12D, and so forth, and a servo layer 13.

Figure 3:
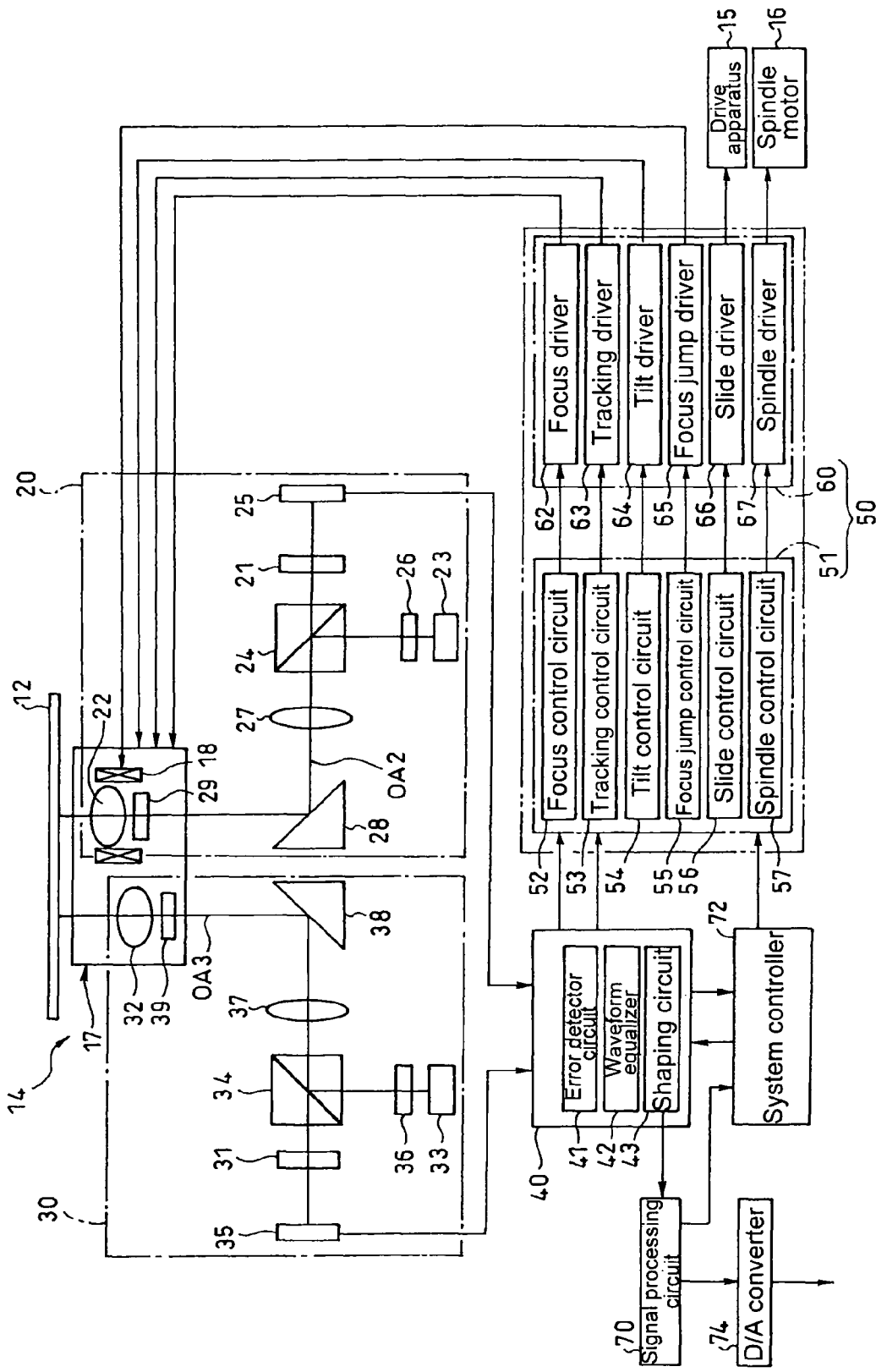
FIG. 3 is a block diagram illustrating the optical systems of the optical head and various circuits used in the first exemplary embodiment.

As shown in FIG. 3, the optical head 14 includes an optical system for recording and reading a signal 20, a servo signal detection optical system 30, and an actuator 17.

The actuator 17 is provided with a recording and reading objective lens 22 for the optical system for recording and reading a signal 20 and a servo objective lens 32 for the servo signal detection optical system 30. These objective lenses 22 and 32 are disposed such that their respective optical center axes 22A and 32A are aligned with the lengthwise direction of the same track 13A, as shown in FIG. 2, on the track 13A of the multi-layered optical recording medium 12. The track 13A includes information recorded therein that indicates the track 13A is a position determination track. Therefore, the position of the optical head 14 can be determined as being proper when light beams passing through the optical center axes 22A and 32A of the recording and reading objective lens 22 and the servo objective lens 32 detect the above information.

The recording and reading objective lens 22 is attached to the actuator 17 through a minute-drive apparatus 18 as a focal point moving mechanism that can minutely drive the lens 22 in a focusing direction. The recording and reading objective lens 22 is driven together with the servo objective lens 32 by the actuator 17. In this case, however, the recording and reading objective lens 22 can also be minutely moved relative to the servo objective lens 32 by the minute-drive apparatus 18 and can be focused on one of the recording layers when the servo objective lens 32 is focused on the servo layer 13.

The optical system for recording and reading a signal 20 is configured to include: a laser light source 23 including a laser diode for emitting a recording and reading laser beam; a polarizing beam splitter 24 for reflecting, in a horizontal direction in FIG. 3, one of the s-polarization and the p-polarization of a light beam emitted from the laser light source 23; the recording and reading objective lens 22 for focusing the light beam passing through the polarizing beam splitter 24 on a specified one of the recording layers of the multi-layered optical recording medium 12; a photodetector 25 for receiving a reflected beam of the above light beam from the multi-layered optical recording medium 12 after the reflected light beam has passed through the recording and reading objective lens 22 and the polarizing beam splitter 24; and a common optical axis OA2.

A diffraction grating 26 is disposed between the laser light source 23 and the polarizing beam splitter 24 on the common optical axis OA2. A collimator lens 27, an upturn mirror 28, and a λ/4 plate 29 are disposed between the polarizing beam splitter 24 and the recording and reading objective lens 22 in that order. A sensor lens 21 is disposed between the polarizing beam splitter 24 and the photodetector 25.

The collimator lens 27 can be moved in the direction of the optical axis by a drive apparatus (not shown). The sensor lens 21 is composed of a cylindrical lens and a spherical lens (not shown), and a predetermined astigmatism is imparted in a direction of about 45° to the light beam having passed through the sensor lens 21. The astigmatism is used to detect the focus error signal (FE signal).

The actuator 17 is composed of, for example, a voice coil motor and configured to perform a focus operation, a tracking operation, and a tilt operation based on a signal from the controller 50.

The minute-drive apparatus 18 can minutely drive the recording and reading objective lens 22 in the focusing direction by means of a voice coil motor, a piezoelectric element, a magnetostrictor, a solenoid, or another similar method such that the focus can jump to any one of the plurality of recording layers. A target recording layer to which the focus jumps is selected in response to an instruction signal that is outputted from the system controller 72 to the minute-drive apparatus 18 based on the information from the multi-layered optical recording medium 12 and a signal from the detector circuit 40.

The diffraction grating 26 is configured to split a light beam emitted from the laser light source 23 as a linearly polarized diverging beam into one main light beam and two sub light beams (a detailed description is omitted here). The two sub light beams are used to detect a tracking error signal (TE signal) using a differential push-pull scheme (hereinafter referred to as the DPP scheme).

The signal recording and reading optical system 20 may be configured such that the focus error signal and the tracking error signal are not detected.

The servo signal detection optical system 30 has the same configuration as that of the signal recording and reading optical system 20. The optical system 30 includes, on a common optical axis OA3, a diffraction grating 36, a polarizing beam splitter 34, a collimator lens 37, an upturn mirror 38, and a λ/4 plate 39 that are disposed in that order between a laser light source 33 and the servo objective lens 32. The servo signal detection optical system 30 further includes: a photodetector 35 that receives the reflected light beam from the multi-layered optical recording medium 12 after the reflected light beam returns to the polarizing beam splitter 34 and passes therethrough; and a sensor lens 31 disposed between the photodetector 35 and the polarizing beam splitter 34.

The detector circuit 40 includes an error detector circuit 41, a waveform equalizer 42, and a shaping circuit 43. The controller 50 includes a control circuit 51 and a driver 61.

The control circuit 51 includes a focus control circuit 52, a tracking control circuit 53, a tilt control circuit 54, a focus jump control circuit 55, a slide control circuit 56, and a spindle control circuit 57.

The driver 61 includes a focus driver 62, a tracking driver 63, a tilt driver 64, a focus jump driver 65, a slide driver 66, and a spindle driver 16.

The controller 50 is configured as mentioned above to provide focus servo, tracking servo, slide servo, and the like for the optical head 14 based on a focus error (FE) signal and a tracking error (TE) signal from the detector circuit 40 and control the rotation of a spindle motor 16.

The signal processing circuit 70 is designed to perform digital signal processing for reading data by subjecting the RF signal from the detector circuit 40 to processing such as demodulation and error detection/correction, and convert the digital data signal to an analog signal through the D/A converter 74 for supplying the analog signal to the output terminal (not shown).

A description will now be given of the process of obtaining a reading signal by irradiating the multi-layered optical recording medium 12 with a light beam emitted from the above signal recording and reading optical system 20.

First, the multi-layered optical recording medium 12 is irradiated with a reading light beam and a servo light beam. The actuator 17 is driven in the radial direction of the multi-layered optical recording medium 12 by the drive apparatus 15 until the position determination track 13A formed in the recording medium 12 in advance is detected, whereby the positions of the common optical axes OA2 and OA3 of the recording and reading objective lens 22 and the servo objective lens 32 are determined.

The laser light source 23 emits a linearly polarized light beam as diverging light, and the emitted light beam is allowed to be incident on the diffraction grating 26 and is split into one main light beam and two sub light beams as described above (hereinafter, these spit light beams are collectively referred to as a light beam unless otherwise specifically defined).

The light beam having passed through the diffraction grating 26 is reflected at the polarizing beam splitter 24, and then converted to a substantially parallel light beam by the collimator lens 27.

After having passed through the collimator lens 27, this light beam is reflected towards the multi-layered optical recording medium 12 by the upturn mirror 28. The polarization of the light beam is changed from linear polarization to circular polarization by the λ/4 plate 29, and the resultant light beam passes through the recording and reading objective lens 22 and is then focused on a target recording layer of the multi-layered optical recording medium 12.

The light beam is reflected on the recording layer, and the reflected light beam is incident on the recording and reading objective lens 22. Then, the light beam is converted to a linearly polarized beam by the λ/4 plate 29, and is allowed to be incident on the polarizing beam splitter 24 via the upturn mirror 28 and the collimator lens 27. Then, the reflected beam (light beam) passes through the polarizing beam splitter 24 and the sensor lens 21 and is incident on the photodetector 25, and the photodetector 25 outputs the reading (RF) signal to the detector circuit 40 based on the incident light beam.

The detector circuit 40 outputs the RF signal to the signal processing circuit 70 via the waveform equalizer 42 and the shaping unit 43. The signal processing circuit 70 performs digital signal processing such as demodulation, and error detection/correction on the RF signal, and the resultant digital data signal is sent to the D/A converter 74. The D/A converter 74 converts the digital data signal to an analog signal and supplies to the output terminal.

In the servo signal detection optical system 30, as in the signal recording and reading optical system 20, the light beam emitted from the laser light source 33 travels via the polarizing beam splitter 34, the collimator lens 37, the upturn mirror 38, and the λ/4 plate 39 in that order and is projected to the multi-layered optical recording medium 12 from the servo objective lens 32.

The reflected light beam from the target recording layer returns in the direction opposite to the above direction. Specifically, the reflected light beam passes through the polarizing beam splitter 34 via the servo objective lens 32, the λ/4 plate 39, the upturn mirror 38, and the collimator lens 37 and is incident on the photodetector 35 after having passed the sensor lens 31. The photodetector 35 outputs a servo signal based on the incident light beam to the detector circuit 40.

The output signal from the photodetector 35 of the servo signal detection optical system 30 is inputted to the detector circuit 40. The detector circuit 40 outputs, from the error detector circuit 41, a focus error (FE) signal to the focus controller 52, a tracking error (TE) signal to the tracking control circuit 53, and a tilt error (TE) signal to the tilt control circuit 54. These error signals cause, through the focus driver 62, the tracking driver 63, and the tilt driver 64, the actuator 17 to perform focus control, tracking control, and tilt control, respectively.

The actuator 17 controls the position of the recording and reading objective lens 22 in the focusing direction such that the light beam having passed through the recording and reading objective lens 22 is focused on a target recording layer. At the same time, the actuator 17 drives the servo objective lens 32 in synchronization with the recording and reading objective lens 22. Therefore, even when the servo light beam is focused on the servo layer 13, the reading light beam may not be focused on the target recording layer.

A focus jump signal from the error detector circuit 41 of the detector circuit 40 is outputted to the focus jump control circuit 55. The focus jump signal causes, through the focus jump driver 65, the minute-drive apparatus 18 to minutely drive the recording and reading objective lens 22 in the focusing direction relative to the servo objective lens 32, whereby quick focus control for focusing the reading light beam on the target recording layer is performed.

In the first exemplary embodiment, the recording and reading objective lens 22 is minutely driven in the focusing direction relative to the servo objective lens 32. In this manner, as compared with the case where the servo light beam and the reading light beam are simultaneously irradiated with through a common object lens, the reading light beam can be focused more quickly. In addition, inter-layer stray light in the multi-layered optical recording medium 12 causes less adverse effects, and the information from the servo layer and the information from the recording layers are reliably separated from each other. Therefore, the information can be read at a higher speed. Moreover, when information is recorded in the multi-layered optical recording medium 12 by the signal recording and reading optical system 20, the information can be recorded at a high speed.

In the first exemplary embodiment, the recording and reading objective lens 22 in the signal recording and reading optical system 20 can be minutely driven relative to the servo objective lens 32 in the servo signal detection optical system 30, but the present invention is not limited thereto. Only the servo objective lens 32 may be provided with a minute-drive apparatus. In this case, upon focusing of the reading beam on any one of the recording layers, the servo light beam is focused on the servo layer 13 by the minute-drive apparatus. Both the recording and reading objective lens 22 and the servo objective lens 32 may be driven by respective minute-drive apparatuses.

Figure 4:
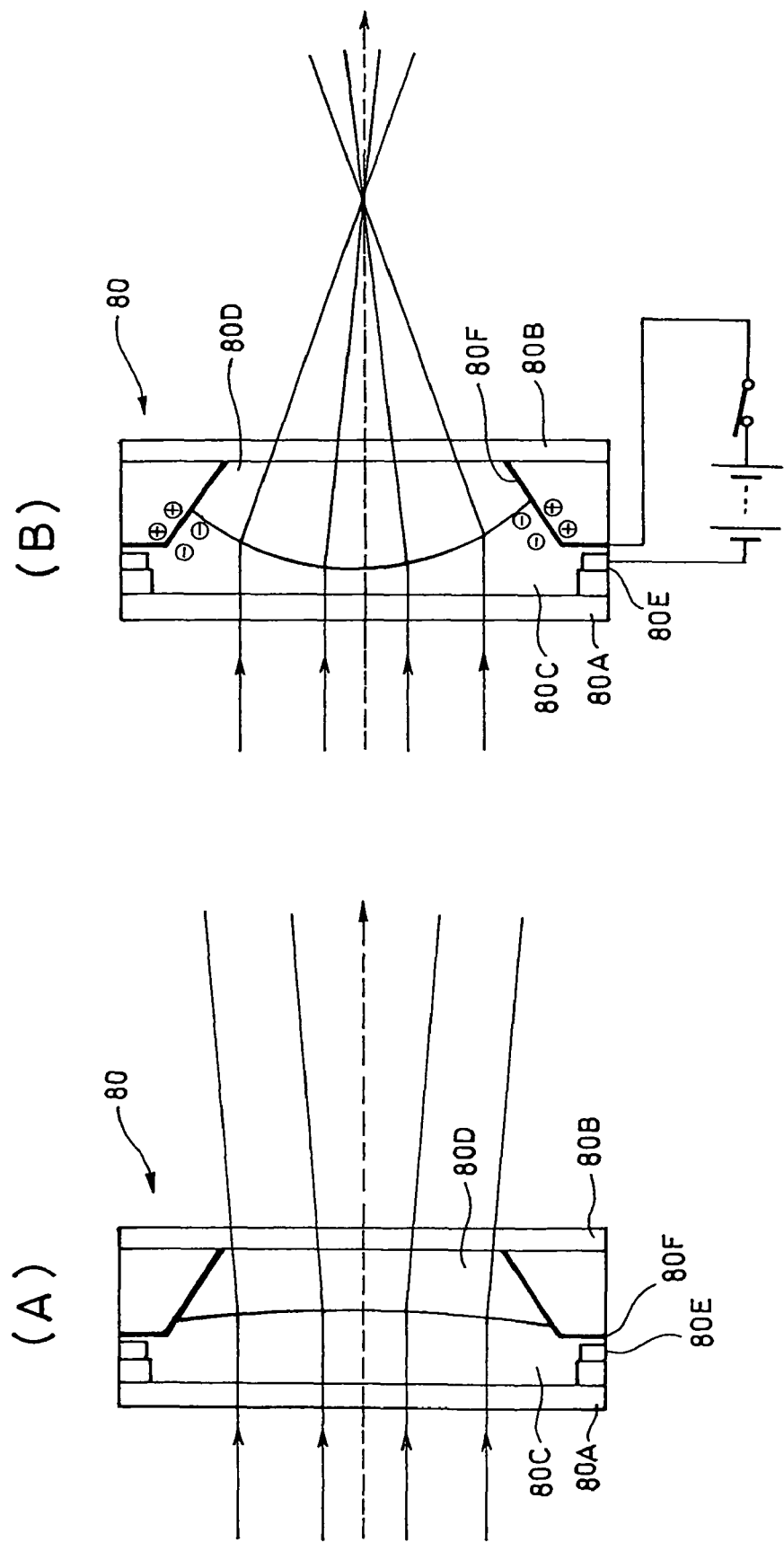
FIGS. 4(A) and 4(B) are cross-sectional views illustrating a main part when a focal point changing mechanism used in a modification of the exemplary embodiment is a liquid lens.

Instead of the minute-drive apparatus, a focal point moving mechanism that can change the focal point may be used for one or both of the recording and reading objective lens 22 and the servo objective lens 32. An exemplary focal point moving mechanism is shown in FIGS. 4(A) and 4(B). In this mechanism, a focal distance changeable liquid lens 80 (for example, a product of Varioptic, France) is used as one of the objective lenses, and the focal distances of the objective lenses are changed relative to each other to perform a focus jump to a target recording layer.

In the liquid lens 80, an aqueous solution layer 80C and an oil layer 80D are disposed in substantially parallel between a pair of parallel transparent substrates 80A and 80B. A cathode electrode 80E is connected to the aqueous solution layer 80C, and an anode electrode 80F is connected to the oil layer 80D. The boundary between these layers is moved such that when a voltage is not applied, transmission light is diverging light (see FIG. 4(A)) and that when a voltage is applied, the transmission light is converging light (see FIG. 4(B)).

Figure 5:
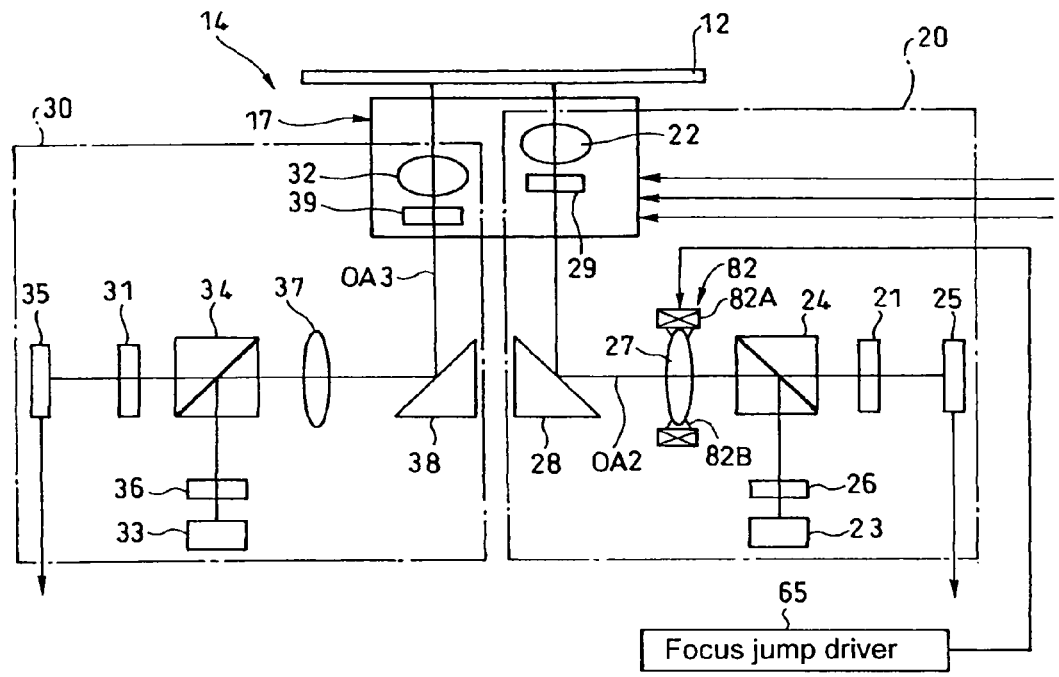
FIG. 5 is a cross-sectional view illustrating a main part when the focal point changing mechanism is a collimator lens moving mechanism.

Another exemplary focal point moving mechanism is shown in FIG. 5. This mechanism is a collimator lens moving mechanism 82 that moves the collimator lens in at least one of the optical systems (for example, the collimator lens 27) in its optical axis direction. In this collimator lens moving mechanism 82, the collimator lens 27 is driven in the direction of the optical axis by a solenoid 82A via a lens holder 82B of the collimator lens 27.

Figure 6:
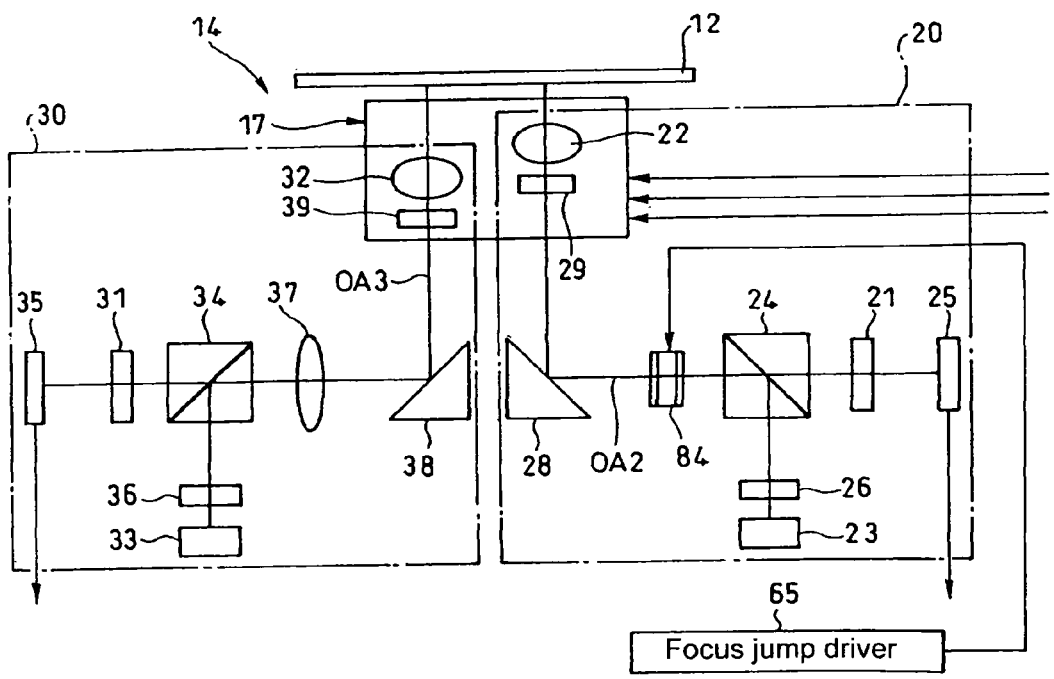
FIG. 6 is a cross-sectional view illustrating a main part when the focal point changing mechanism is a liquid lens used instead of the collimator lens.

As shown in FIG. 6, the collimator lens 27 may be a liquid lens 84 similar to the liquid lens 80. In this case, the actuator is not provided with minute-drive apparatus. This is advantageous in that the size of the actuator can be small.

In the above exemplary embodiments, the present invention is applied to a recording and reading system for a multi-layered optical recording medium and to an optical head device used therefor. However, the present invention is applicable to a reading system that does not perform recording and to a reading optical head device used therefor.

What is claimed is:

1. An optical head device, comprising: a signal reading optical system including a signal reading objective lens; and a servo signal detection optical system including a servo objective lens, the optical head device for irradiating a multi-layered optical recording medium including a plurality of recording layers and a single servo layer with a reading light beam via the signal reading objective lens and with a servo light beam through the servo objective lens, and for receiving the reading light beam reflected from the multi-layered optical recording medium through the signal reading objective lens and the servo light beam reflected from the multi-layered optical recording medium through the servo objective lens, the signal reading objective lens and the servo objective lens are disposed such that optical center axes thereof are aligned with a same track of the multi-layered optical recording medium so as to be arranged in a lengthwise direction of the track, and the single servo layer is at different point on the optical center axis of the servo objective lens from the plurality of recording layers, the optical head device further comprising:
a common actuator on which the signal reading objective lens and the servo objective lens are disposed;
a focal point moving mechanism for moving minutely a focal point of one of the signal reading objective lens and the servo objective lens in a focusing direction relative to the other of the signal reading objective lens and the servo objective lens while the signal reading objective lens and the servo objective lens are driven by the common actuator, and focusing another on the servo layer or one of the recording layers when the one of the signal reading objective lens and the servo objective lens is focused on the one of the recording layers or the servo layer.

2. The optical head device according to claim 1, wherein the focal point moving mechanism is a minute-drive apparatus that mounts the one of the signal reading objective lens and the servo objective lens to the common actuator so as to be minutely driven in a focusing direction.

3. The optical head device according to claim 1, wherein:
each of the signal reading optical system and the servo signal detection optical system includes a collimator lens; and
the focal point moving mechanism is a collimator lens drive apparatus for driving in a direction of an optical axis one of the collimator lenses of the signal reading optical system and the servo signal detection optical system.

4. A reading system for a multi-layered optical recording medium, comprising:
the optical head device according to claim 1; and
the multi-layered optical recording medium including the plurality of recording layers and the single servo layer.

* * * * *